UNITED STATES PATENT OFFICE.

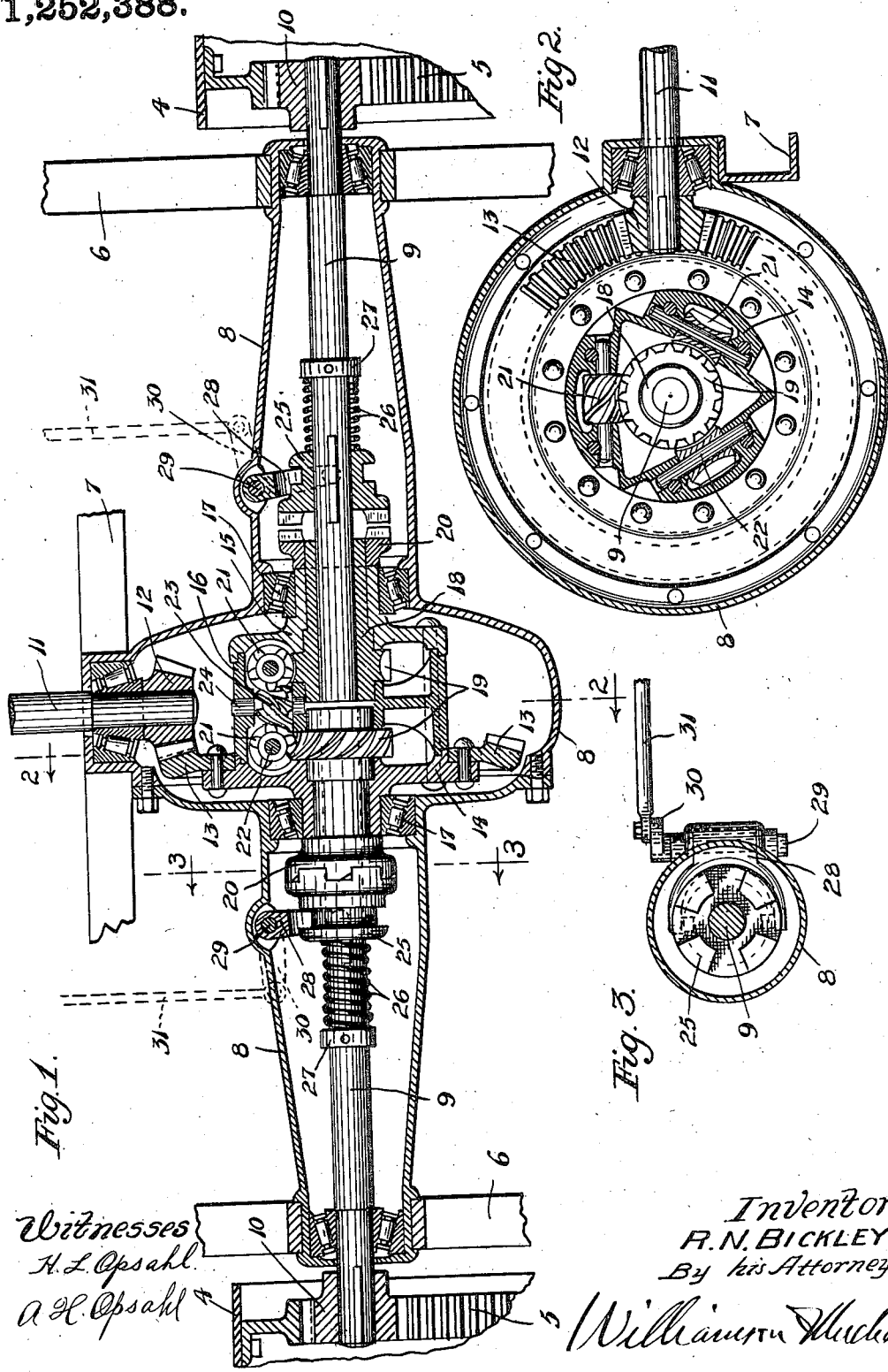

RALPH N. BICKLEY, OF MINNEAPOLIS, MINNESOTA.

DIFFERENTIAL-TRANSMISSION MECHANISM.

1,252,388.   Specification of Letters Patent.   Patented Jan. 8, 1918.

Application filed March 1, 1917. Serial No. 151,696.

*To all whom it may concern:*

Be it known that I, RALPH N. BICKLEY, a citizen of the United States, residing at Minneapolis, in the county of Hennepin and State of Minnesota, have invented certain new and useful Improvements in Differential-Transmission Mechanism; and I do hereby declare the following to be a full, clear, and exact description of the invention, such as will enable others skilled in the art to which it appertains to make and use the same.

My invention has for its object to provide an improved differential transmission for motor-propelled vehicles. The invention, however, is more particularly adapted for use in connection with heavy slow moving motor propelled vehicles that are generally designated as tractors.

The object of the invention is to combine with the differential gear mechanism, clutch devices, whereby either one of two laterally spaced traction wheels may be positively driven while the other is idle, to thereby cause the tractor to be positively and abruptly turned in either direction, at will.

My invention consists in applying clutches in the connections between the two wheels and the corresponding differential driven shafts or rotary members of the differential gear. Such application of the clutches, in connection with the customary beveled gear differential, for example, would be futile and impracticable, because, when the clutch on one side is thrown out, the released differentially driven members would simply spin and there would be no resistance against which to drive the wheel on the other side.

I have, however, found that by applying the clutches, as above stated, in connection with what may be designated as a self-locking differential, the desirable results above indicated will be attained and it is possible to positively drive either both traction wheels, differentially through the transmission mechanism, or to positively drive either one of the two traction wheels through the said differential gear while the other traction wheel is idle and no driving force applied thereto.

By a self-locking differential, is meant a differential which will differentially drive two traction wheels in turning corners, or in deviating from straight line travel, but which will not cause one of the traction wheels to spin ahead of the other, even if such wheel be entirely lifted from the ground. A self-locking differential gear of this character is in extensive commercial use and is known to the trade as the "M & S" differential, the same being manufactured by the M. & S Company, of Detroit, Michigan; and in the accompanying drawings I have illustrated my invention as applied in connection with a worm or spiral gear differential transmission of the said "M & S" type.

In the accompanying drawings which illustrate the invention, like characters indicate like parts throughout the several views.

Referring to the drawings;

Figure 1 is a horizontal section with some parts broken away, illustrating one of the ways of applying my invention;

Fig. 2 is a vertical section on the line 2—2 of Fig. 1; and

Fig. 3 is a vertical section on the line 3—3 of Fig. 1.

Of the parts of the tractor illustrated, the numeral 4 indicates the laterally spaced traction wheels having internal gears 5; the numerals 6 and 7 indicate side and cross bars of the truck frame; the numeral 8 indicates, as an entirety, the rear axle and differential gear housing, which, at its ends, is secured to the side bars 6, and at its front intermediate portion is connected to the cross bar 7; the numeral 9 indicates axially alined shafts journaled in suitable bearings in the housing 8 and capable of independent rotation; and the numeral 10 indicates pinions secured to the outer ends of the shafts 9 and meshing with the internal gears 5 of the traction wheels 4. The numeral 11 indicates the engine-driven shaft journaled in a suitable bearing in the gear housing and provided therein with a beveled pinion 12. This bevel pinion 12 meshes with a bevel gear 13. This bevel gear 13 is the master gear of the differential mechanism and is rigidly secured to three body elements 14, 15 and 16. The said elements 14, 15 and 16 make up a sort of a housing and form a part of the body of the complete master gear, or driving element of the differential mechanism, and hence, it will, of course, be understood that the said elements 13, 14, 15 and 16 partake of common rotation. The elements 14 and 15 have hubs journaled in the housing 8, as shown, by means of roller bearings 17. Journaled in the hubs of the said elements 14 and 15 and loosely journaled on the inner ends of the respective shafts 9 are sleeves 18, which at their inner ends are provided with worm or spiral gears 19, and at their outer ends are provided with rigidly secured half clutches 20. The worm gears 19 mesh with smaller worm or spiral gears 21 that have shafts 22 journaled in the member 16 of the master wheel (see particularly Fig. 2). These spiral gears 21 are in the commercial form of the "M & S" differential, arranged in multiple, or in sets, as shown in Fig. 2, and the transversely opposite spiral gears 21 mesh with an intermediate spiral gear 23, the shaft 24 of which is radially disposed in respect to the axis of the shafts 9.

The differential action produced through these spiral or worm gears in turning corners with both wheels on the ground is substantially the same as that in an ordinary differential, but the said worm gears are set at such angle that instantly and automatically, the driving force will be concentrated on the wheel which is free or offers relatively little resistance, will not be caused to spin ahead of the wheel that is firmly set upon the ground, or that has good traction with the ground. The said differential gear is, therefore, self-locking against spinning movements of a loose or free wheel ahead of the other.

In this arrangement, it will be remembered that the sleeve-like hubs of the worm gears 19 are loose on the respective shafts 9. They are, however, adapted to be coupled to the said respective shafts 9 by means of sliding half clutches 25 that coöperate with the respective half clutches 20. These half clutches 25 are keyed to rotate with the respective shafts 9, but free to slide thereon, and moreover, are preferably subject to coiled springs 26 that tend to keep the said coöperating half clutches engaged. These coiled springs 26, as shown, surround the respective shafts 9 and re-act against collars 27 thereon. The half clutches 20 and 25 are shown as of the positive intermeshing type, but in some cases, they might be friction clutches.

For moving the half clutches 25 into released positions, I have shown shipper levers 28 having short shafts 29 journaled in bearings on the axle housing 8, and provided at their outer ends with arms 30 to which operating rods 31 are pivotally connected at their rear ends. These operating rods 31 may be operated from a distant point, either by foot or by hand power.

Obviously, when both of the clutches are engaged, the two traction wheels will be differentially driven, but neither thereof can be caused to slip or spring ahead of the other. When the clutch at the right is disengaged, for example, as shown in Fig. 1, it is evident that all of the power will be transmitted to the left hand traction wheel, thereby causing the tractor to turn toward the right. Obviously, also, in like manner, the tractor may be positively caused to turn toward the left by releasing the left hand clutch, while the right hand clutch is in action. This gives a very positive means for causing a tractor to positively turn short corners, or to turn completely around within small space, and to do this, also, regardless of condition of the soil. The application of the clutches in combination with a self-locking differential, is believed to be new and is known to be highly important, especially in connection with tractors.

In the drawings, the clutches are shown as applied to shafts that carry pinions for direct engagement with gears on the traction wheels, but in other arrangements, clearly within the scope of the invention, the said divided shaft might be a counter shaft connected to the traction wheels through other or entirely different transmission mechanism.

What I claim is:

1. The combination with the traction wheels of a vehicle, of a transmission mechanism connected to the said two traction wheels and comprising a locking differential gear, and clutches applied between said differential gear and the said traction wheels and operative, at will, to connect said differential gear, independently to either traction wheel, or simultaneously to both traction wheels.

2. The combination with the traction wheels of a vehicle, of a transmission mechanism connected to the said two traction wheels and comprising a self-locking differential gear, and clutches applied between said differential gear and the said traction wheels and operative, at will, to connect said differential gear, independently to either traction wheel, or simultaneously to both traction wheels, the said clutches having spring devices normally holding the same operative and having connections for independently releasing the same.

3. The combination with the traction wheels of a vehicle, of a transmission mechanism comprising a self-locking worm gear differential, two alined shafts, transmission devices connecting said alined shafts, one to each of said traction wheels, half clutches, one connected to each side of said differential, and coöperating half clutches carried by, but slidable on said two alined shafts for simultaneous or independent engagement with the coöperating first noted differentially driven half clutches.

In testimony whereof I affix my signature in presence of two witnesses.

RALPH N. BICKLEY.

Witnesses:
CLARA DEMAREST,
BERNICE G. WHEELER.